United States Patent [19]

Ahad

[11] Patent Number: 4,882,395
[45] Date of Patent: Nov. 21, 1989

[54] BRANCHED HYDROXY-TERMINATED ALIPHATIC POLYETHERS

[75] Inventor: Elie Ahad, Ste-Foy, Canada

[73] Assignee: Her Majesty the Queen in right of Canada, as represented by Minister of National Defence of Her Majesty's Canadian Government, Ottawa, Canada

[21] Appl. No.: 260,113

[22] Filed: Oct. 20, 1988

[30] Foreign Application Priority Data

Jul. 4, 1988 [CA] Canada ................................. 571721

[51] Int. Cl.$^4$ ...................... C08G 65/24; C08G 65/32
[52] U.S. Cl. ..................................... 525/407; 525/403
[58] Field of Search ................. 525/407, 403; 528/405

[56] References Cited

U.S. PATENT DOCUMENTS

| | | | |
|---|---|---|---|
| 3,645,917 | 2/1972 | Vandenberg | 525/403 X |
| 3,971,743 | 7/1976 | Breslow | 525/407 X |
| 4,379,894 | 4/1983 | Frankel et al. | 525/403 |

*Primary Examiner*—Earl Nielsen
*Attorney, Agent, or Firm*—Nixon & Vanderhye

[57] ABSTRACT

The invention disclosed is a process for the preparation of branched hydroxy-terminated aliphatic polyethers having alkyl azide substituents, having a structural formula

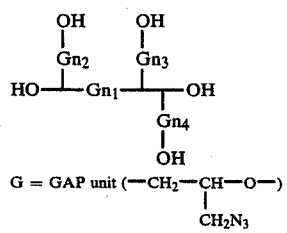

G = GAP unit ($-CH_2-CH-O-$)
                                 |
                                 $CH_2N_3$ $n_1$ = number of GAP units in segment 1
$n_2$ = number of GAP units in segment 2
$n_s$ = number of GAP units in segment s
s = total number of segments in the molecule
n = total degree of polymerization (total number of GAP units)

$$n = (n_1 + n_2 + n_3 + n_4 \ldots + n_s) = \sum_{i=1}^{s}$$

$5 \leq n \leq 400,$ and a molecular weight of abotu 500 to 40,000, and a process for the preparation thereof which comprises the single step of reacting a solid rubbery polyepichlorohydrin (PECH) of molecular weight of about $0.5-5.0 \times 10^6$ with epichlorohydrin monomer (ECH) and an ionic azide selected from the group consisting of sodium azide, lithium azide and potassium azide, in a suitable organic solvent at elevated temperature, while agitating. According to a further aspect of the invention, the molecular weight of the polyether product may be controlled by adjusting the weight ratio of ECH:PECH, while maintaining a weight ratio of ionic azide: (ECH+PECH) of about 1:1.

41 Claims, No Drawings

BRANCHED HYDROXY-TERMINATED ALIPHATIC POLYETHERS

This invention relates to hydroxy-terminated aliphatic polyethers having alkyl azide substituents and in particular to such polyethers of a branched chain structure.

Hydroxy-terminated aliphatic polyethers having alkyl azide substituents are useful as energetic binders and plasticizers in solid propellants and composite explosives. One such polyether is glycidyl azide polymer (GAP). This polymeric azide is used as an energetic binder (at MW 2,000–10,000) and as a plasticizer (at MW of about 500) in composite explosives and solid rocket propellant systems to impart additional energy to the formulations, increase the performance and enhance the stability and the mechanical properties of the system.

Linear hydroxy-terminated aliphatic polyethers having alkyl azide substituents, e.g. GAP, and a process for making same are described in U.S. Pat. No. 4,268,450 of May 19, 1981, in the name of M. B. Frankel et al. According to the Frankel et al process, in a first reaction step, the starting material, epichlorohydrin (ECH) is polymerized to polyepichlorohydrin (PECH) using a catalyst, boron trifluoride ($BF_3$) in the presence of a dichloro compound such as carbon dichloride. In a second step, PECH is azidized using a molar excess of the order of 2:1 sodium azide ($NaN_3$) in the presence of a polar organic solvent dimethyl formamide (DMF) for three days at 100° C. It is emphasized that a molar excess, of about 2:1, of sodium azide is typically employed. Since sodium azide is of a poisonous nature, the use of large amounts is a distinct disadvantage. A final purification step using methylene chloride and drying over magnesium sulfate is also described. This multi step process is costly and takes from four to seven days to complete.

It is emphasized that Frankel et al's product is a linear polymer. This is apparent from the functionality of the polymer as determined from the defined structural formula, i.e. including two OH groups, one at each end, and confirmed by the single example wherein the functionality is given as two. In fact, according to Frankel's process only linear polymers may be obtained.

The multi step process can be avoided by purchasing the PECH commercially and azidizing as per the second step, as is done by R. A. Earl in U.S. Pat. No. 4,486,351 of Dec. 4, 1984. However, the polyethers obtained according to Earl's process have essentially the same molecular weight as the starting reactant PECH (i.e., the chemical reaction which occurs is a simple replacement of Cl by $N_3$ in the polymer structure). Moreover, the choice of commercially available PECH with specific molecular weight is limited and costs are relatively high.

In applicant's co-pending Canadian application Serial No. 524,263, filed Dec. 1, 1986, an improved process for the synthesis of hydroxy-terminated aliphatic polyethers having azide substituents is described. In that process, the polyethers such as glycidyl azide polymer (GAP) are prepared in a single step directly from epichlorohydrin (ECH) monomer by reacting ECH with an ionic azide, e.g. sodium azide, in a suitable polar organic solvent, such as dimethyl formamide (DMF). A small amount of ethylene glycol (EG) is typically included as an initiator. However, this method yields polyethers of low molecular weight (about 500) that effectively limits their use to energetic plasticizers.

It is thus an object of the invention to provide branched chain hydroxy-terminated aliphatic polyethers having alkyl azide substituents.

It is a further object of the present invention to provide a novel single step synthesis for the preparation of branched chain hydroxy-terminated aliphatic polyethers having alkyl azide substituents, such as GAP, of lower molecular weight, from the degradation of a relatively cheap solid rubbery PECH starting material having a much higher molecular weight.

According to the invention a branched hydroxy-terminated aliphatic polyether having alkyl azide substitutents of the following structural formula is provided

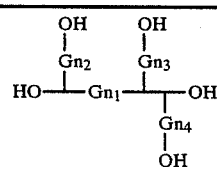

G = GAP unit ($-CH_2-CH-O-$)
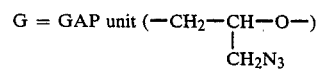

$n_1$ = number of GAP units in segment 1
$n_2$ = number of GAP units in segment 2
$n_s$ = number of GAP units in segment s
s = total number of segments in the molecule
n = total degree of polymerization
(total number of GAP units)

$$n = (n_1 + n_2 + n_3 + n_4 \ldots + n_s) = \sum_{i=1}^{s} n_i$$

$5 \leq n \leq 400$, and a molecular weight of 500 to 40,000.

According to another aspect of the invention a process is provided for the preparation of branched hydroxy-terminated aliphatic polyethers having alkyl azide substituents, having a structural formula

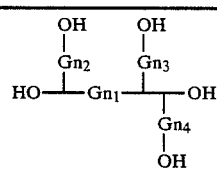

G = GAP unit ($-CH_2-CH-O-$)
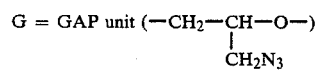

$n_1$ = number of GAP units in segment 1
$n_2$ = number of GAP units in segment 2
$n_s$ = number of GAP units in segment s
s = total number of segments in the molecule
n = total degree of polymerization
(total number of GAP units)

$$n = (n_1 + n_2 + n_3 + n_4 \ldots + n_s) = \sum_{i=1}^{s} n_i$$

$5 \leq n \leq 400$, and a molecular weight of 500 to 40,000, which comprises the single step of reacting a solid rubbery polyepichlorohydrin (PECH) of molecular weight of about 0.5–5.0×10$^6$ with epichlorohydrin monomer (ECH) and an ionic azide selected from the group consisting of sodium azide, lithium azide and potassium azide, in a suitable organic solvent at elevated temperature, while agitating.

The reaction mechanism is believed to involve (a) the degradation and azidation of the high MW rubbery PECH are accomplished simultaneously by sodium azide and temperature;

(b) the polymerization and azidation of epichlorohydrin (ECH) are carried out simultaneously by sodium azide according to a single-step process (as disclosed in our co-pending Canadian application Serial No. 524,263, filed Dec. 1, 1986) to yield short growing chains of low MW (~500) GAP; and (c) these short growing chains of GAP thus formed are then grafted to the degraded rubbery matrix via chain transfer and give rise to termination and branching reactions.

Preferably, the weight ratio of ionic azide to the sum (PECH+ECH) is about 1:1. The preferred ionic azide is sodium azide. Thus, the amount of ionic azide employed is significantly less than required in the Frankel et al process described above. Moreover, no catalyst, e.g. BF$_3$, is required in our process.

According to another aspect of the invention, the molecular weight of the hydroxy-terminated aliphatic polyether having alkyl azide substituents product is controlled or predetermined by adjusting the weight ratio of ECH:PECH, while maintaining the weight ratio of ionic azide: (ECH+PECH) of about 1:1 in the reaction mixture, (i.e. for a given solvent and reaction temperature). For example, the molecular weight of GAP product is lowered by increasing the weight ratio ECH:PECH, (i.e. the molecular weight of the GAP product is inversely proportional to the weight ratio ECH:PECH.) while maintaining the weight ratio of NaN$_3$:(ECH+PECH) of about 1:1 in the reaction mixture.

More specifically, the MW of the GAP product depends on the temperature, solvent and the ECH concentration. A decrease in the reaction temperature will cause a reduction in the degradation rate and thus a MW increase, i.e. by lowering the temperature we simultaneously increase the MW and the reaction time for a given ECH concentration. For example, at lower temperatures the reaction time is longer, i.e. at 100° C. the reaction time is about 10 h, while at 70° C., it is about 5 days. Accordingly, ECH concentration is used to control the MW of the GAP product. At a certain temperature and in a given solvent, the MW of GAP is lowered by increasing the ratio (ECH/PECH) in the reaction mixture.

The solvents employed in our process must dissolve the rubbery PECH and also sodium azide in order to accomplish both the degradation and azidation reactions. Suitable organic solvents include polar organic solvents such as dimethyl formamide (DMF), and dimethyl sulfoxide (DMSO). Non-polar organic solvents may also be employed. For example, butyl acetate may be employed in conjunction with ethylene glycol to provide a mixed butyl acetate/ethylene glycol solvent. It is also contemplated that polyethyleneoxides of molecular weight in the range of 400 to 1,000 may be employed as solvent.

A small amount of ethylene glycol (EG) is conveniently used as an initiator.

The reaction temperature is typically in the range of 70°–100° C., with a temperature of about 100° C. being preferred.

The reaction time is about 10 hours.

Only DMF and DMSO are practically recommended in the temperature range from 70° to 100° C. As for the other solvents (polyethyleneoxide and butyl acetate-/EG), it is preferable to carry out the degradation at 100° C. because a low temperature (such as 70° C.) will require a much longer reaction time and will yield a product with relatively higher MW.

More preferably, an initial exothermic reaction is allowed to proceed at an initial temperature of about 70°–80° C., followed by heating to about 100° C. to complete the reaction. Specifically, the exothermic reaction arises from the opening of the epoxide ring of ECH which is caused by sodium azide and proceeds for about thirty minutes. The "30 minutes" period is approximate and depends on the duration of the gradual addition of sodium azide to the reaction mixture. The exothermic reaction is barely noticeable for low ECH concentrations but becomes more significant as the proportion of ECH is increased in the reaction mixture. The reaction is also less exothermic when accomplished under a nitrogen atmosphere. It is preferable to heat the reaction mixture at 70°–80° C. (approx) during the addition of NaN$_3$ in order to control the exothermic reaction. Once the sodium azide addition is over and no sudden rise in temperature is observed, then heating to 100° C. starts.

Preferably upon cooling, the polymer is washed with water to remove DMF, EG, unreacted sodium azide and the by-product sodium chloride. Three washes with hot water (60° C.) have been found appropriate.

Preferably, the washing step is followed by a purification step which involves dissolving the polymer in a suitable organic solvent such as methylene chloride, drying over magnesium sulfate, and passing through a column containing silica gel. The solvent is then driven off by heating.

Turning again to the novel branched chain polymers according to our invention, when used as an energetic binder they exhibit certain superior physio-chemical properties relative to their linear counterparts.

Referring first to functionality, as indicated above, linear polymers as described in Frankel et al's U.S. Pat. No. 4,268,450, have an indicated functionality (f) of 2.

f is determined from the ratio (Mn/Me), wherein Mn and Me are respectively the number average MW and hydroxyl equivalent weight. When using the same relation, one actually observes functionality less than 2 for the linear GAP samples prepared according to Frankel's process. As shown in Table 2, GAP obtained from the degradation process has an average functionality value of 10.1±7%.

Moreover, the viscosity of a branched polymer will be generally lower than the viscosity of a linear polymer with a similar MW. Consequently, the branched polymer will have a higher MW compared to the linear polymer with a similar viscosity. The following empirical relation was established between the MW of a branched and linear GAP polymers for a given viscosity:

$$M_B = 0.15 M_L^{1.35}$$

$M_B$ is the MW of a branched GAP obtained from the degradation process. $M_L$ is the MW of a linear GAP prepared according to Frankel's process and having the same viscosity as the branched polymer. Since the viscosity is an important factor in the processing of the binder formulation, the degradation process enables then the production of higher MW branched GAP in the same viscosity range (4500–10,000 cp) normally used in the processing of linear GAP of lower MW as shown in Table 1. It will thus be appreciated that the branched polymers according to our invention enable the use of higher molecular weight binders in composite explosives and propellants, while maintaining the viscosity at sufficiently low levels so as not to hinder processing. Moreover, the direct relationship between viscosity and molecular weight of binder results in a lower useful upper limit molecular weight for linear polymers relative to their branched counterparts.

TABLE 1

| Viscosity at 25° C. (cp) | $M_L$ | $M_B$ |
|---|---|---|
| 4,500 | 2,000 | 4,200 |
| 10,000 | 3,000 | 7,400 |

A low glass transition temperature (Tg) is usually an indication of superior physio-chemical properties for the binder and as Tg decreases when the MW is reduced, the degradation process enables then the production of branched GAP with relatively high MW but with still a much lower Tg compared to linear GAP. As shown in Table 2, branched GAP of MW 9000 has a Tg of −60° C. compared to a Tg of −50° C. for linear GAP of MW 2000.

As indicated in Table 2 our branched products have a high endothermic heat of formation, +42.2±1% Kcal/mole, i.e. the heat of formation is substantially constant for products in the molecular weight range of 5,000 to 36,000. By way of comparison, a linear GAP of molecular weight of about 2000, made according to the process described in aforementioned U.S. Pat. No. 4,268,450 has a heat of formation of about +28.4 Kcal/mole. This is important from the standpoint of propellant formulation since the specific impulse ($I_{sp}$) of a propellant is proportional to the heat of formation of the reactants ($\Delta H_f$) according to the relation: $I_{sp} \Delta (\Delta H_f)^{\frac{1}{2}}$.

EXAMPLE 10 g of a commercial solid rubbery PECH sample (MW ~ $1.0 \times 10^6$) is dissolved in DMF (50 g) for approximately two hours; agitation and heating at 100° C. are started. ECH (1.50 g) and EG (2 g) are then added to the mixture and the temperature is lowered to approximately 70°–80° C. Sodium azide (11.5 g) is gradually added to the reaction mixture in order to control the initial exothermic reaction. Once the addition of sodium azide is over and no sudden rise in temperature is observed, then the reaction mixture is heated to about 100° C. and the agitation is carried out at this temperature for about 10 hours. Heating and agitation are stopped and the reaction mixture is allowed to cool. The polymer is given three 50 ml hot water (60° C.) washes to remove DMF, EG and the salts (sodium azide and sodium chloride). The polymer is dissolved in 75 ml MC. The MC solution is dried over magnesium sulfate and then is passed through a column containing 5 g of silica gel. The resultant solution is heated to 50° C. to remove MC and then dried in vaccuo to yield 11.0 g of the GAP polymer: a viscous liquid with an amber colour. The GAP was characterized and had the following properties.

Elemental Analysis

C (38.0); H (5.5); N (42.4); Cl (0.3) wt. %

Nitrogen and Chloride analysis of the polymer as well as NMR spectroscopy confirmed that quantitative conversion of PECH and ECH to GAP was achieved.

The MW of the GAP product can be controlled (i.e. for a given solvent and reaction temperature) and adjusted to the desired value by varying the relative proportions of the reactants (ECH/PECH/NaN$_3$) as shown in the following Table:

TABLE 2

| ECH (g) | PECH (g) | NaN$_3$ (g) | MW of GAP | f | Tg (°C.) | Heat of Combustion Kcal/mole | Heat of Formation Kcal/mole |
|---|---|---|---|---|---|---|---|
| 0.25 | 10 | 10.25 | 36,000 | 10.5 | −50 | | |
| 0.75 | 10 | 10.75 | 21,400 | 10.8 | −55 | −496 ± 1% | +42.2 ± 1% |
| 1.5 | 10 | 11.5 | 9,000 | 9.5 | −60 | | |
| 3.5 | 10 | 13.5 | 5,000 | 10.0 | −60 | | |

The results in Table 2 were obtained by employing DMF as solvent in the process described in the example above.

The embodiments of the invention in which an exclusive property or privilege is claimed is defined as follows:

1. A process for the preparation of branched hydroxy-terminated aliphatic polyethers having alkyl azide substituents, having a structural formula

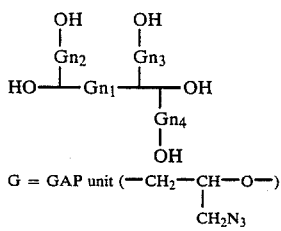

G = GAP unit ($-CH_2-CH-O-$)
                              |
                           $CH_2N_3$ $n_1$ = number of GAP units in segment 1
$n_2$ = number of GAP units in segment 2
$n_s$ = number of GAP units in segment s
s = total number of segments in the molecule
n = total degree of polymerization (total number of GAP units)

$n = (n_1 + n_2 + n_3 + n_4 \ldots + n_s) = \sum_{i=1}^{s}$ $5 \leq n \leq 400$, and a molecular weight of 500 to 40,000, comprising the single step of reacting a solid rubbery polyepichlorohydrin (PECH) of molecular weight of about $0.5–5.0 \times 10^6$ with epichlorohydrin and an ionic azide selected from the group consisting of sodium azide, potassium azide and lithium azide, in a suitable organic solvent at elevated temperature, while agitating.

2. A process as claimed in claim 1, wherein the organic solvent is selected from the group consisting of dimethyl formamide, dimethyl sulfoxide, butyl acetate/ethylene glycol mixture and polyethyleneoxide of molecular weight of 400 to 1,000.

3. A process as claimed in claim 2, wherein the organic solvent is dimethyl formamide.

4. A process as claimed in claim 3, wherein the ionic azide is sodium azide.

5. A process as claimed in claim 4, wherein ethylene glycol is included as initiator.

6. A process as claimed in claim 5, wherein the elevated temperature is about 70°–100° C.

7. A process as claimed in claim 6, wherein the PECH is dissolved in dimethyl formamide before reacting with ECH and sodium azide.

8. A process as claimed in claim 7, wherein the sodium azide is added gradually at a reaction temperature of about 70°–80° C., and when the addition of sodium azide is complete and no sudden rise in temperature is observed, the reaction temperature is raised to about 100° C.

9. A process as claimed in claim 8, wherein the reaction time is about 10 hours.

10. A process as claimed in claim 9, wherein the reaction is carried out under a nitrogen atmosphere.

11. A process as claimed in claim 10, including the additional step of washing the polymer so formed with water.

12. A process as claimed in claim 11, including the further additional step of purifying the polymer by dissolving the washed polymer in a suitable organic solvent, drying over magnesium sulfate and passing through a column containing silica gel.

13. A process as claimed in claim 4, wherein the weight ratio of sodium azide to the sum (PECH+ECH) is about 1:1.

14. A process as claimed in claim 13, wherein the molecular weight of the PECH is about $1.0 \times 10^6$.

15. A process for the preparation of branched hydroxy terminated aliphatic polyethers having alkyl azide substituents, of controlled molecular weight, having a structural formula

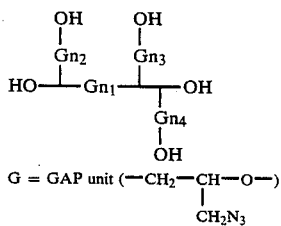

$G$ = GAP unit $(-CH_2-CH-O-)$
                      $|$
                      $CH_2N_3$ $n_1$ = number of GAP units in segment 1
$n_2$ = number of GAP units in segment 2
$n_s$ = number of GAP units in segment s
$s$ = total number of segments in the molecule
$n$ = total degree of polymerization (total number of GAP units)

$n = (n_1 + n_2 + n_3 + n_4 \ldots + n_s) = \sum_{i=1}^{s}$ $5 \leq n \leq 400$, and a molecular weight of 500 to 40,000, comprising the single step of reacting a solid rubbery polyepichlorohydrin (PECH) of molecular weight of about 0.514 $5.0 \times 10^6$ with epichlorohydrin and an ionic azide selected from the group consisting of sodium azide, potassium azide and lithium azide, in a suitable organic solvent at elevated temperature, while agitating, and wherein the molecular weight of the polyether is controlled by adjusting the weight ratio of ECH:PECH while maintaining a weight ratio of ionic azide: (ECH+PECH) of about 1:1.

16. A process as claimed in claim 15, wherein the organic solvent is selected from the group consisting of dimethyl formamide, dimethyl sulfoxide, butyl acetate/ethylene glycol and polyethyleneoxide of molecular weight 400 to 1,000.

17. A process as claimed in claim 16, wherein the organic solvent is dimethyl formamide.

18. A process as claimed in claim 17, wherein the ionic azide is sodium azide.

19. A process as claimed in claim 18, wherein ethylene glycol is included as initiator.

20. A process as claimed in claim 19, wherein the elevated temperature is about 70°–100° C.

21. A process as claimed in claim 20, wherein the PECH is dissolved in dimethyl formamide before reacting with ECH and sodium azide.

22. A process as claimed in claim 21, wherein the sodium azide is added gradually at a reaction temperature of about 70°–80° C., and when the addition of sodium azide is complete and no sudden rise in temperature is observed, the reaction temperature is raised to about 100° C.

23. A process as claimed in claim 22, wherein the reaction time is about 10 hours.

24. A process as claimed in claim 23, wherein the reaction is carried out under a nitrogen atmosphere.

25. A process as claimed in claim 24, including the additional step of washing the polymer so formed with water.

26. A process as claimed in claim 25, including the further additional step of purifying the polymer by dissolving the washed polymer in a suitable organic solvent, drying over magnesium sulfate and passing through a column containing silica gel.

27. A process as claimed in claim 26, wherein the molecular weight of the PECH is about $1.0 \times 10^6$.

28. A process as claimed in claim 27, wherein the weight of sodium azide is about 10.25 g and wherein the weight of ECH is about 0.25 g and the weight of PECH is about 10 g.

29. A process as claimed in claim 27, wherein the weight of sodium azide is about 10.75 g and wherein the weight of ECH is about 0.75 g and the weight of PECH is about 10 g.

30. A process as claimed in claim 27, wherein the weight of the sodium azide is about 11.5 g and wherein the weight of ECH is about 1.5 g and the weight of PECH is about 10 g.

31. A process as claimed in claim 27, wherein the weight of the sodium azide is about 13.5 g and wherein the weight of ECH is about 3.5 g and the weight of PECH is about 10 g.

32. Branched hydroxy-terminated aliphatic polyethers having alkyl azide substituents, of controlled molecular weight, having a structural formula

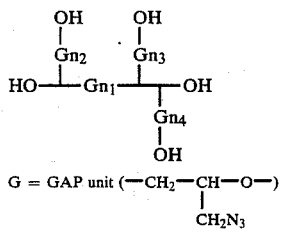

$G$ = GAP unit ($-CH_2-CH-O-$)
                              |
                            $CH_2N_3$ $n_1$ = number of GAP units in segment 1
$n_2$ = number of GAP units in segment 2
$n_s$ = number of GAP units in segment s
$s$ = total number of segments in the molecule
$n$ = total degree of polymerization (total number of GAP units)

$$n = (n_1 + n_2 + n_3 + n_4 \ldots + n_s) = \sum_{i=1}^{s}$$

$5 \leq n \leq 400$, and a molecular weight of 500 to 40,000, when prepared by a process as claimed in claim 15.

33. Hydroxy-terminated aliphatic polyethers having alkyl azide substituents, of molecular weight of about 36,000, when prepared by a process as claimed in claim 28.

34. Hydroxy-terminated aliphatic polyethers having alkyl azide substituents, of molecular weight of about 21,400, when prepared by a process as claimed in claim 29.

35. Hydroxy-terminated aliphatic polyethers having alkyl azide substituents, of molecular weight of about 9,000, when prepared by a process as claimed in claim 30.

36. Hydroxy-terminated aliphatic polyethers having alkyl azide substituents, of molecular weight of about 5,000, when prepared by a process as claimed in claim 31.

37. Branched hydroxy-terminated aliphatic polyethers having alkyl azide substituents, having a structural formula

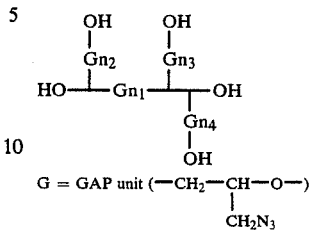

$G$ = GAP unit ($-CH_2-CH-O-$)
                              |
                            $CH_2N_3$ $n_1$ = number of GAP units in segment 1
$n_2$ = number of GAP units in segment 2
$n_s$ = number of GAP units in segment s
$s$ = total number of segments in the molecule
$n$ = total degree of polymerization (total number of GAP units)

$$n = (n_1 + n_2 + n_3 + n_4 \ldots + n_s) = \sum_{i=1}^{s}$$

$5 \leq n \leq 400$, and a molecular weight of 500 to 40,000.

38. Hydroxy-terminated aliphatic polyethers according to claim 37, having a molecular weight of about 36,000, a functionality of about 10.5 and a Tg(° C.) of about −50.

39. Hydroxy-terminated aliphatic polyethers according to claim 37, having a molecular weight of about 21,400, a functionality of about 10.8 and a Tg(° C.) of about −55.

40. Hydroxy-terminated aliphatic polyethers according to claim 37, having a molecular weight of about 9,000, a functionality of about 9.5 and a Tg(° C.) of about −60.

41. Hydroxy-terminated aliphatic polyethers according to claim 37, having a molecular weight of about 5,000, a functionality of about 10.0 and a Tg(° C.) of about −60.

* * * * *